US006763715B2

United States Patent
Corghi

(10) Patent No.: US 6,763,715 B2
(45) Date of Patent: Jul. 20, 2004

(54) LOCKING AND DRIVE UNIT FOR A ROTATING BODY, IN PARTICULAR FOR MOTOR VEHICLE WHEELS IN A BALANCING MACHINE

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/673,475

(22) Filed: Sep. 30, 2003

(65) Prior Publication Data

US 2004/0065150 A1 Apr. 8, 2004

(30) Foreign Application Priority Data

Oct. 2, 2002 (IT) .................................... RE2002A0074

(51) Int. Cl.[7] .............................................. G01M 1/06
(52) U.S. Cl. ........................................................ 73/487
(58) Field of Search ........................... 73/66, 460, 462, 73/471, 473, 475, 487

(56) References Cited

U.S. PATENT DOCUMENTS

| | | | | | |
|---|---|---|---|---|---|
| 4,202,213 A | * | 5/1980 | Toriselli | ...................... | 73/487 |
| 4,423,633 A | * | 1/1984 | Coetsier | ...................... | 73/487 |
| 5,347,866 A | * | 9/1994 | Maurer | ........................ | 73/487 |
| 5,383,361 A | * | 1/1995 | Matumoto | ................... | 73/471 |
| 5,615,574 A | * | 4/1997 | Drechsler et al. | ............. | 73/487 |
| 5,703,291 A | * | 12/1997 | Rossteuscher | ............... | 73/487 |
| 5,777,224 A | * | 7/1998 | Coetsier et al. | ............... | 73/487 |
| 5,900,548 A | * | 5/1999 | Buzzi | .......................... | 73/487 |
| 6,074,118 A | * | 6/2000 | Ferrari et al. | ................. | 403/31 |

FOREIGN PATENT DOCUMENTS

DE          40 00 424          7/1991

* cited by examiner

*Primary Examiner*—Hezron Williams
(74) *Attorney, Agent, or Firm*—Browdy and Neimark, P.L.L.C.

(57) ABSTRACT

The locking and drive unit comprises, for supporting the rotating body (10) and rotating it about an axis A, a motorized main shaft (20) carrying flange means which define a counteracting surface (26) for the rotating body; and pressing means (31, 32) coaxial with the shaft (20) to axially press the rotating body (10) against said counteracting surface (26) and to lock it relative thereto; a traction rod (40) is associated with the main shaft (20), is movable axially relative thereto and is connected to the pressing means (31, 32) to pull them against the counteracting surface (26). Elastic thrust means (45) are connected to the traction rod (40) to axially pull, via this latter, the pressing means (31, 32) against the counteracting surface (26) to lock the rotating body relative thereto. The invention comprises an impact damping means (60) acting by mutual movement of two of its elements (61, 62) in the same direction as the axis of the main shaft (20) when the traction rod (40) is moved in the sense of pulling the pressing means (31, 32) towards the counteracting surface (26), one of said elements (61, 62) being rigid with the main shaft (20) and the other element being rigid with the traction rod (40).

4 Claims, 5 Drawing Sheets

LOCKING AND DRIVE UNIT FOR A ROTATING BODY, IN PARTICULAR FOR MOTOR VEHICLE WHEELS IN A BALANCING MACHINE

BACKGROUND OF THE INVENTION

This invention relates to a locking and drive unit for a rotating body, in particular for motor vehicle wheels in a balancing machine.

Typically the invention is provided for balancing motor vehicle wheels, however it can also be applied to other rotating bodies, such as flywheels.

The unit to which the invention relates comprises:

for supporting and driving the rotating body, a motorized main shaft carrying flange means which define a counteracting surface for the rotating body;
pressing means coaxial with the shaft to axially press the rotating body against said counteracting surface and to lock it relative thereto;
a traction rod associated with the main shaft and movable axially relative thereto, and connected to the pressing means to pull them against the counteracting surface;
elastic thrust means (consisting for example of a robust precompressed spring) connected to the traction rod to axially pull, via this latter, the pressing means against the counteracting surface to lock the rotating body relative thereto.

A unit having these characteristics for a balancing machine is described in German patent document DE 40 00 424.

In use, when a wheel has to be fitted to the main shaft, the traction rod is firstly moved axially to withdraw the pressing means from the counteracting surface (to the right in the accompanying FIG. 1) by the action of a fixed pneumatic cylinder-piston unit acting on a first end of the traction rod such as to move the rod in the opposite direction to the force generated by the elastic thrust means. The wheel is then positioned on the shaft with the web of its wheel rim placed against the counteracting surface, and suitable pressing means (usually consisting of a conical centering cone and a locking ring nut) are mounted on the shaft in contact with the web, so that this is sandwiched between the counteracting surface and the pressing means, but without substantial axial pressure; the pneumatic cylinder-piston unit is then unloaded to nullify its thrust on the traction rod, so that this, by the action of the elastic means, undergoes traction with a strong thrust such that the wheel web is strongly clamped between the pressing means and the counteracting surface, to an extent such as to achieve reliable rigidity between the wheel and shaft.

However this operation involves risks due to the fact that sometimes, during that stage in which the wheel is manually brought into contact with the contact surface and the pressing means are placed against the wheel, this latter can lock, due to friction, against any obstacle before adhering to the counteracting surface, for example against the cone or against the shaft, and hence not be perfectly in contact with the pressing means; in such cases, when the pneumatic cylinder-piston unit acting on the traction rod is discharged and the rod remains subjected only to the action of the elastic means, the obstacle which had locked the wheel is overcome and energy stored in the elastic means is suddenly released, to be dissipated as a violent impact by the moving parts against the fixed part.

Again, it can happen that the ring nut (which in most cases is of the rapid release type) is erroneously released before the cylinder-piston unit acts on the traction rod to discharge it. Again in this case the energy stored in the elastic means is suddenly released, to be dissipated as a violent impact by the moving parts against the fixed part.

This can result in damage to parts of the machine, in particular to the measurement components and the bearings, or in noise which is absolutely unacceptable in a precision machine.

SUMMARY OF THE INVENTION

An object of this invention is to obviate said drawback by a technical solution which is constructionally simple and operationally effective.

This and other objects are attained by the invention as characterised in the claims.

The invention is based on the fact of comprising:
an impact damping means, acting by mutual movement of two of its elements in the same direction as the axis of the main shaft when the traction rod is moved in the sense of pulling the pressing means towards the counteracting surface, a first of said elements being rigid with the main shaft and the other element being rigid with the traction rod.

Said damping means comprises a closed cylindrical chamber, filled with damping fluid and within which a piston is sealedly slidable, said piston possessing a constricted aperture for passage of damping fluid from one side of the chamber to the other when the traction rod is moved in the sense of pulling the pressing means against the counteracting surface, said piston and said chamber being rigid with the traction rod and with the cylindrical chamber respectively, or vice versa.

BRIEF DESCRIPTON OF THE DRAWINGS

The invention is described in detail hereinafter with the aid of the accompanying figures which illustrate a non-exclusive embodiment thereof by way of example.

DESCRIPTION OF THE PREFERRED EMBODIMENT

Figure 1:
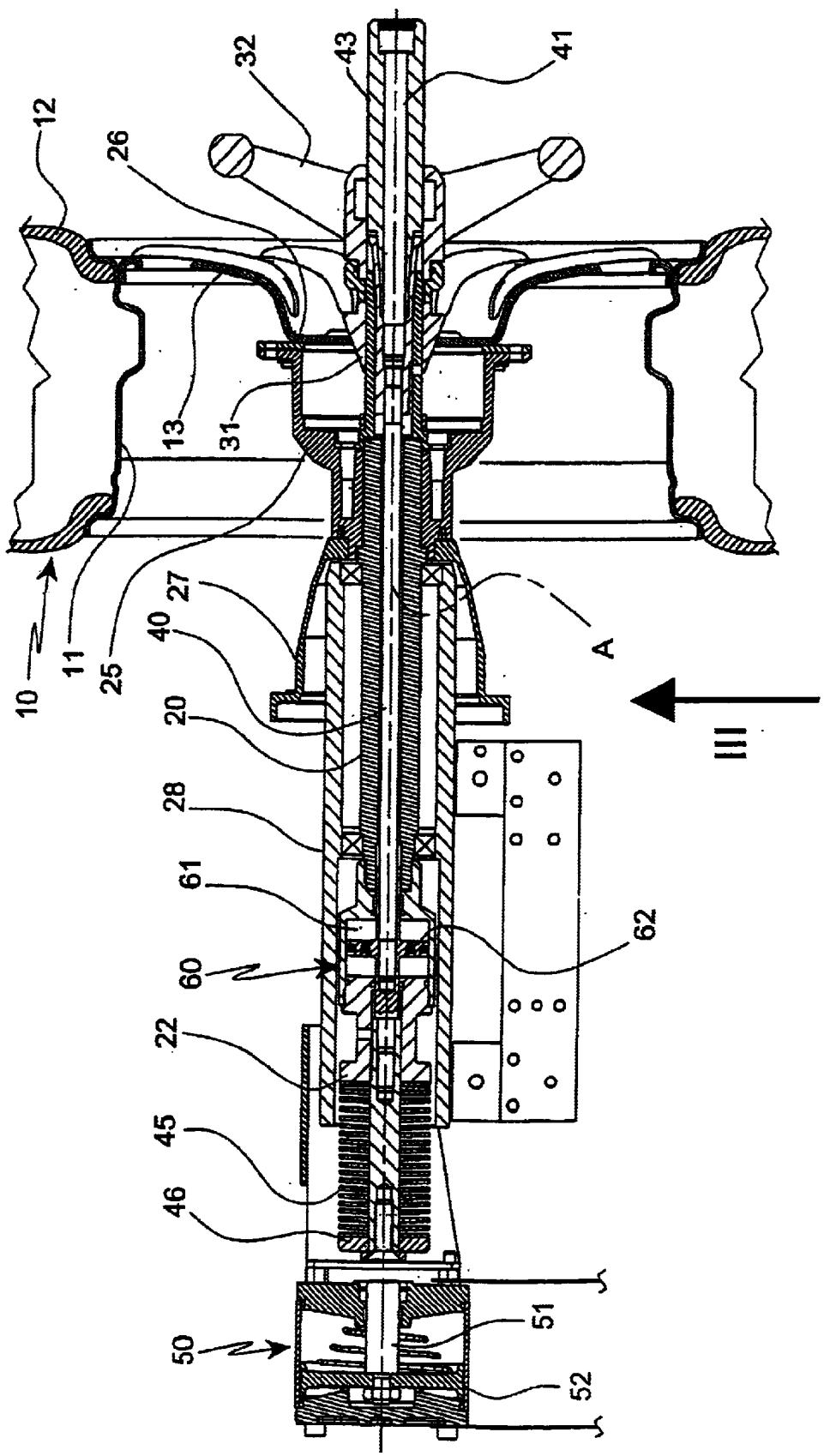
FIG. 1 is a section through the unit on a horizontal axial plane.
Figure 1A:
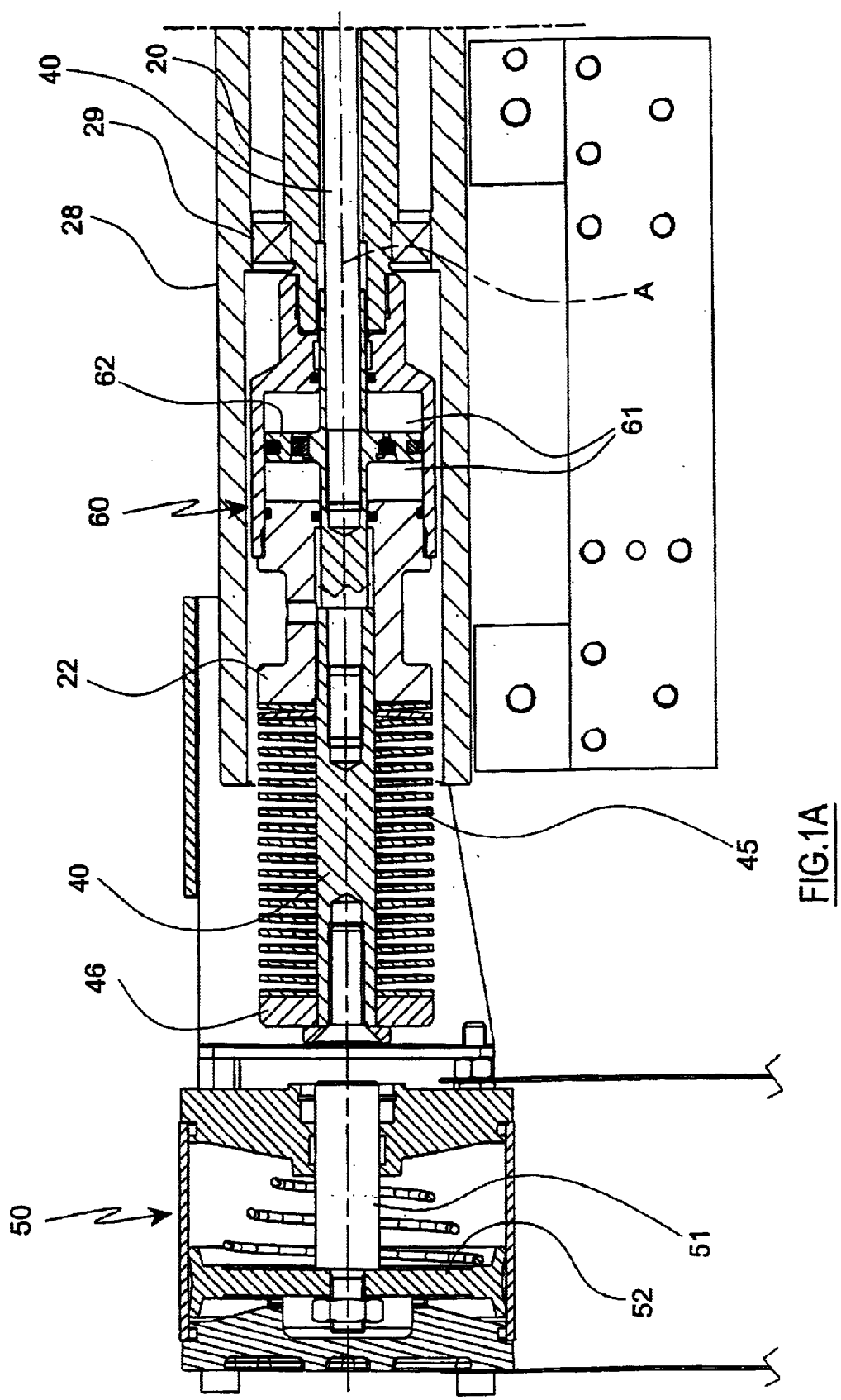
FIG. 1A shows the rear portion of FIG. 1 on an enlarged scale.
Figure 1B:
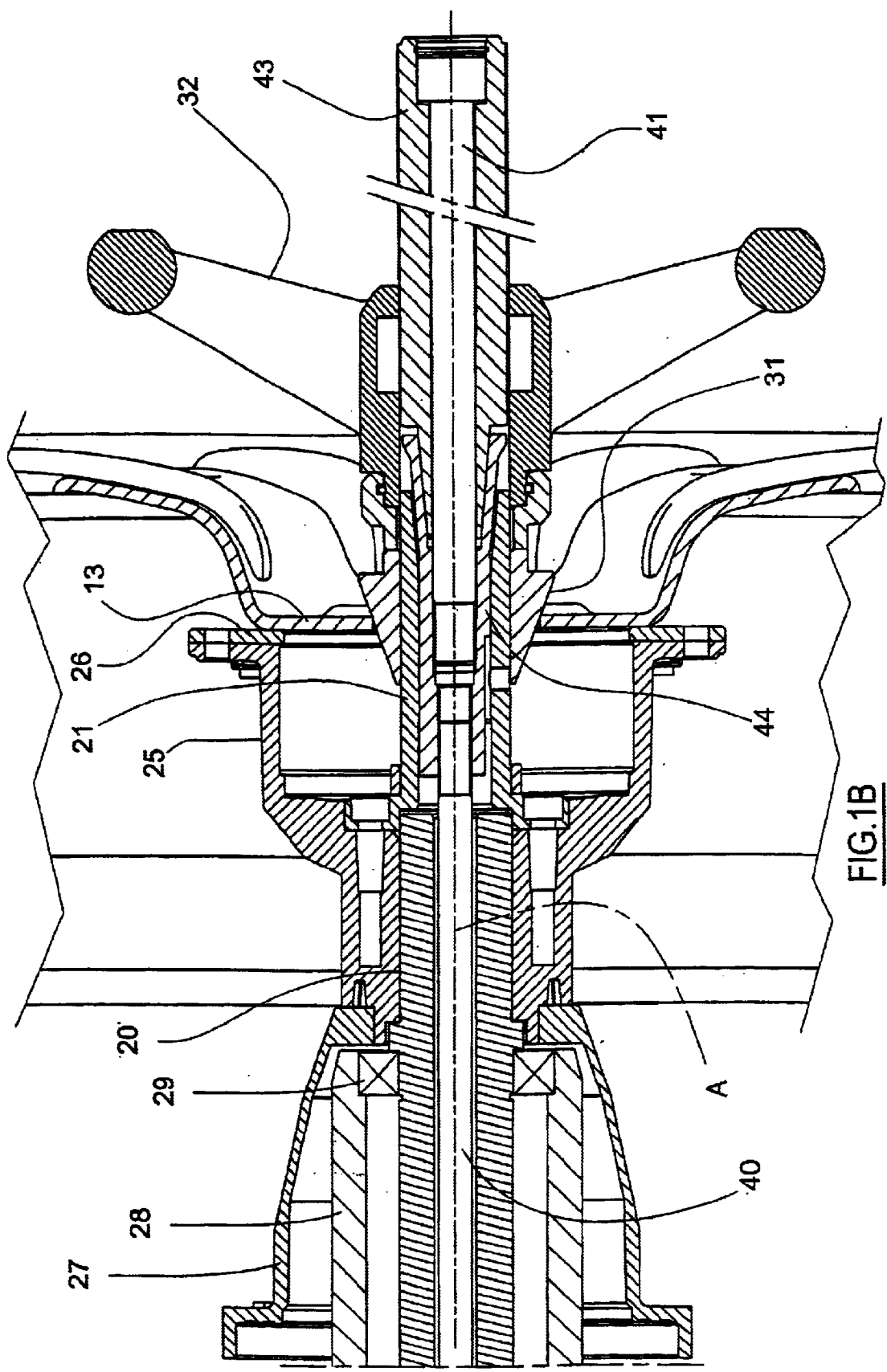
FIG. 1B shows the front portion of FIG. 1 on an enlarged scale.
Figure 1C:
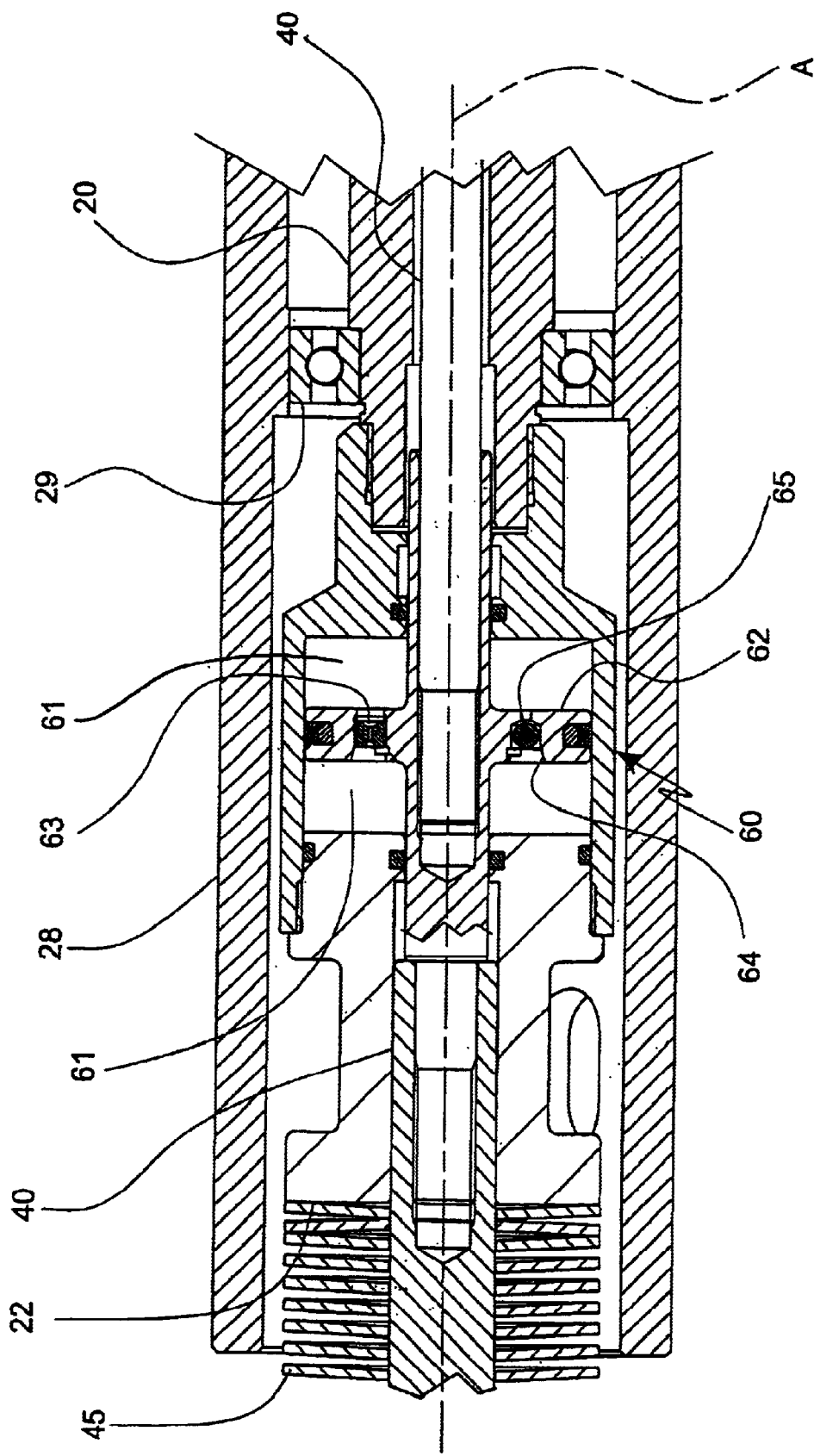
FIG. 1C shows a further enlarged detail of FIG. 1.
Figure 2:
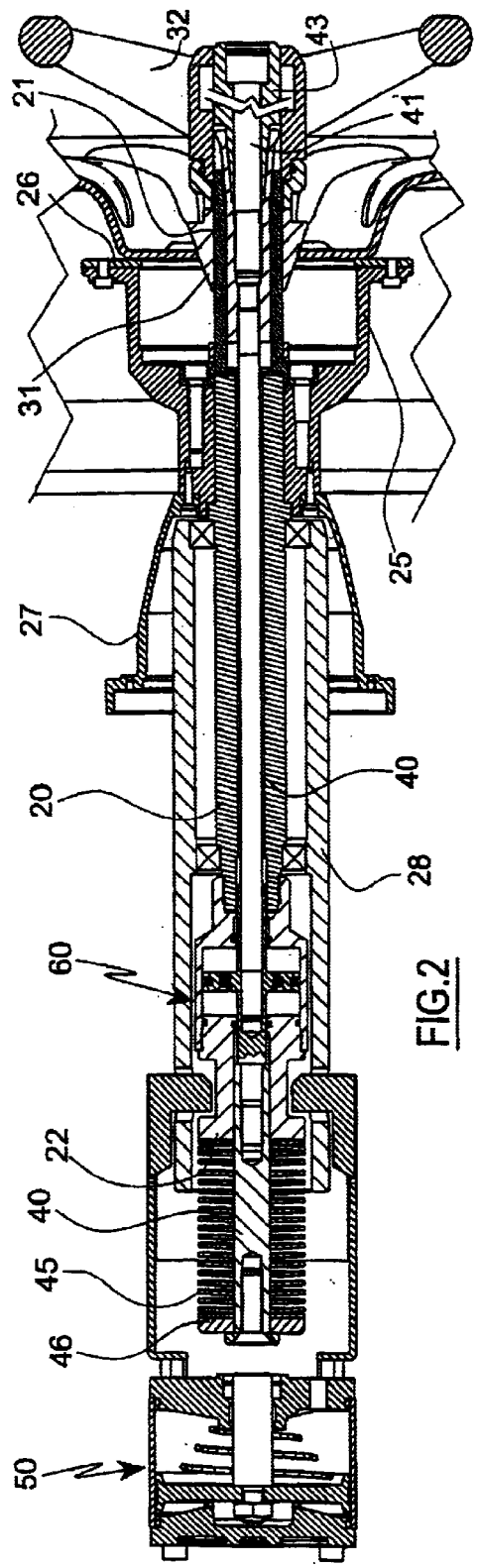
FIG. 2 is a section through FIG. 1 on a vertical axial plane.
Figure 3:
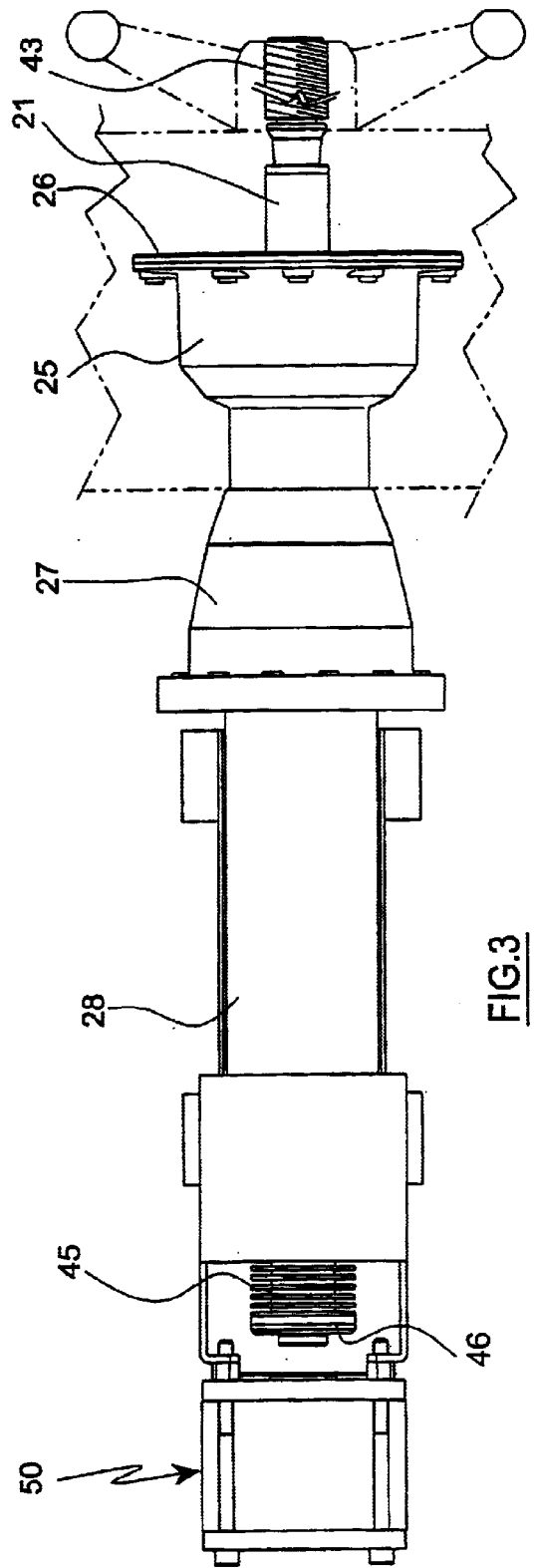
FIG. 3 is a side view of FIG. 1.

The unit shown in the figures is for a balancing machine for motor vehicle wheels 10, which usually comprise a wheel rim 11 having a transverse plate (web) 13 through the centre of which the axis of rotation of the wheel 10 passes, and a tire 12 applied to the outer surface of the wheel rim 11.

In accordance with to the known art, the unit of the invention comprises, for supporting the wheel (rotating body) 10 and rotating it about an axis A, a motorized main shaft 20 carrying flange means 25 which define a counteracting surface 26 for the wheel 10 perpendicular to the shaft axis A.

Specifically, the means 25 consist of a cap joined coaxially to the shaft 20 and traversed by the shaft, and having its concavity facing the front end thereof.

The front edge of the cap 25 defines a transverse plane which defines said counteracting surface 26.

To the rear of the cap 25 there is positioned a second cap 27, also coaxial to the shaft 20 and to which there are connected the transmission means (not shown in the figures) which connect the shaft 20 to a motor (not shown in the figures) for rotating the shaft.

The shaft 20 is supported, via bearings 29, by a fixed tubular support 28 which is supported by the fixed frame of the machine.

The wheel 10 is made rigid with the counteracting surface 26 by pressing means coaxial to the shaft 20 and arranged to axially press the wheel 10 against said counteracting surface 26 in order to lock and centre it relative to the shaft 20.

In the embodiment shown in the figures, said pressing means comprise a centering cone 31 and a locking ring nut 32 (both of known type and shown schematically in the figures) which act against the web 13 to sandwich it against the counteracting surface 26 and centre it about the axis A.

The shaft 20 possesses a through axial cavity within which there is disposed a traction rod 40 axially movable relative to it and connected to the pressing means 31, 32 to pull these latter against the counteracting surface 26.

In the embodiment shown in the figures, the rod 40 possesses a front end portion 41 which projects forwards from the front end portion 21 of the shaft 20, which itself projects through and beyond the cap 25. A threaded cylinder 43 is joined coaxially to said portion 41, together with a further guide cylinder 44 which is coupled coaxially and telescopically to the front end portion 21 of the shaft, relative to which it is axially movable. The locking ring nut 32 engages the cylinder 43 such that on axially pulling the rod 40 towards the left in the figure, the ring nut 32 and with it the cone 31 are urged against the web 13 so that this is urged against and into contact with the counteracting surface 26.

This traction action of the rod 40 is effected by the thrust product by elastic thrust means 45 connected to the traction rod 40. Specifically, said thrust means consist of a robust spring 45 precompressed between the rear end 22 of the shaft 20 and a disc 46 fixed to the rear end of the rod 40; the action of the spring 45 is such as to axially pull the rod 40 towards the left and, by virtue thereof, the pressing means 31 and 32 against the counteracting surface 26, with a force such as to achieve reliable rigidity between the wheel and the counteracting surface 26.

Second thrust means 50 are also associated with the unit of the invention to release the wheel 10 from the counteracting surface 26. These means 50 comprise a fixed pneumatic cylinder-piston unit coaxial with the shaft 20 and positioned close to the rear end of the rod 40, and comprising a pusher 51 operated by the piston 52 to axially move the rod 40 by directly thrusting the rear end of it, in the opposite direction and opposite sense to the thrust produced by the spring 45.

When in use, the wheel 10 is rotated by the shaft 20 by virtue of its rigidity with the counteracting surface 26 generated by the thrust produced by the spring 45 and transmitted to the pressing means 31 and 32 by the traction rod 40; this thrust also releases the ring nut 32 from the threaded cylinder 43. During this stage the cylinder-piston unit 50 is unloaded and its pusher 51 is spaced from the rod 40.

To release the wheel from the surface 26 the thrust of the spring 45 must firstly be annulled, this being achieved by pushing the rod 40 against the action of the spring (i.e. towards the right) by means of the cylinder-piston unit 25, to withdraw the ring nut 32 from the counteracting surface 26.

This releases the ring nut 32, at which point the wheel can be extracted from the shaft 20.

A further wheel 10 is mounted on the shaft 20 and locked against the counteracting surface 26 while in this configuration, i.e. while the rod 40 is maintained urged against the action of the spring 45. When the wheel 10 has been positioned on the shaft with its web 13 placed against the counteracting surface 26, the centering cone 31 is inserted into contact with the web 13 and is locked axially by means of the locking ring nut 32. At this point, by unloading the cylinder-piston unit 50 the spring 45 is released to hence pull and clamp the pressing means against the wheel 10 and this latter against counteracting surface 26. For this to occur smoothly and without impact, the invention comprises an impact damping means 60, preferably comprising a closed cylindrical chamber 61 filled with operative damping fluid, and within which a piston 62 is sealedly slidable; the two said elements of the damping means 60 (i.e. the chamber 61 and the piston 62 are rigid with the shaft 20 and with the traction rod 40, respectively (however the opposite arrangement is also possible), these means acting by the mutual movement of the elements 61, 62 in the same direction as the axis A of the main shaft when the traction rod 40 is moved in the direction produced by the thrust of the spring 45 to pull the pressing means 31, 32 against counteracting surface 26.

Specifically, the piston 62 presents a constricted through aperture 63 which enables the damping fluid to pass from one side of the chamber 61 to the other in a throttled manner, and preferably a second through aperture 64 in which a unidirectional valve 65 is positioned; this enables the damping fluid to pass freely from one side of the chamber 61 to the other only when the traction rod 40, and with it the piston 62, is moved in the opposite direction to the thrust of the spring 45 to withdraw the pressing means 31, 32 from the counteracting surface 26; however it prevents passage of the damping fluid when the piston 62 is moved in the opposite direction.

In the embodiment illustrated in the figures, the chamber 61 is defined by a cylindrical enclosure formed within the body of the shaft 20 and coaxial with the axis A. The traction rod 40 coaxially traverses the entire chamber 61 and carries the piston 62 rigid with it.

When, during the locking of the wheel 10 onto the shaft 20, the traction rod 40 is moved in the direction of the thrust produced by the spring 45, to pull the cone 31 and ring nut 32 towards the wheel 10 lying against the counteracting surface 26, the damping fluid is prevented from passing through the second aperture 64 and is therefore compelled to pass only through the constricted aperture 63, with the result that the movement of the piston 62 and hence of the pressing means 31 and 32 takes place relatively smoothly, and any sudden movements are damped. Hence any risk of impacts (as already described with reference to traditional machines) between the axially movable parts and the fixed parts which come into mutual contact is avoided, as is hence the risk of damage consequent on such impacts.

Numerous modifications of a practical and applicational nature can be made to the invention, but without leaving the scope of the inventive idea as claimed below.

What is claimed is:

1. A locking and drive unit for a rotating body, in particular for motor vehicle wheels in a balancing machine, comprising:

for supporting the rotating body (10) and rotating it about an axis A, a motorized main shaft (20) carrying flange means which define a counteracting surface (26) for the rotating body;

pressing means (31, 32) coaxial with the shaft (20) to axially press the rotating body (10) against said counteracting surface (26) and to lock it relative thereto;

a traction rod (40) associated with the main shaft (20) and movable axially relative thereto, and connected to the pressing means to pull them against the counteracting surface (26);

elastic thrust means (45) connected to the traction rod (40) to axially pull, via the latter, the pressing means (31, 32) against the counteracting surface (26) to lock the rotating body (10) relative thereto;

characterised by comprising an impact damping means (60) acting by mutual movement of two of its elements (61, 62) in the same direction as the axis (A) of the main shaft (20) when the traction rod (40) is moved in the sense of pulling the pressing means (31, 32) towards the counteracting surface (26), one of said elements (61, 62) being rigid with the main shaft (20) and the other element being rigid with the traction rod (40).

2. A unit as claimed in claim 1, characterised in that said damping means (60) comprises a closed cylindrical chamber, filled with damping fluid and within which a piston is sealedly slidable, said piston possessing a constricted aperture for passage of damping fluid from one side of the chamber to the other when the traction rod is moved in the sense of pulling the pressing means against the counteracting surface, said piston and said chamber being rigid with the traction rod and with the cylindrical chamber respectively, or vice versa.

3. A unit as claimed in claim 2, characterised in that said piston (62) comprises a second through aperture (64) having a unidirectional valve (65) enabling the damping fluid to pass freely from one side of the chamber (61) to the other when the traction rod (40) is moved in the sense of withdrawing the pressing means (31, 32) from the counteracting surface (26).

4. A unit as claimed in claim 2, characterised in that the chamber (61) is defined by a cylindrical enclosure formed within the body of the shaft (20) and coaxial with the axis (A.), said chamber (61) being traversed axially by the traction rod (40), which carries the piston (62) rigid with it.

* * * * *